United States Patent

Shridhar et al.

Patent Number: 5,815,714
Date of Patent: Sep. 29, 1998

[54] EMBEDDED DEBUG COMMANDS IN A SOURCE FILE

[75] Inventors: Avadhani Shridhar, Sunnyvale; John Simons, Burlingame, both of Calif.

[73] Assignee: Hitachi America, Ltd., Tarrytown, N.Y.

[21] Appl. No.: 839,229

[22] Filed: Apr. 21, 1997

Related U.S. Application Data

[63] Continuation of Ser. No. 366,050, Dec. 29, 1994, abandoned.

[51] Int. Cl.$^6$ ...................................................... G06F 9/45
[52] U.S. Cl. ............................................... 395/704
[58] Field of Search ............................................. 395/704

[56] References Cited

U.S. PATENT DOCUMENTS 5,265,254  11/1993  Blasciak et al. ......................... 395/700
5,321,828   6/1994  Phillips et al. ........................... 395/500

OTHER PUBLICATIONS

*UNIX Programmer's Manual*, vol. 5, "Languages and Support Tools", Ed. Steven V. Earhart, Holt, Rinehart and Winston (1986).
Ream, E.K. "Debugging with Sherlock." C Users Journal, vol. 10, n6, Jun. 1992. pp. 121(3).

Primary Examiner—Emanuel Todd Voeltz
Assistant Examiner—Peter J. Corcoran, III
Attorney, Agent, or Firm—Flehr Hohbach Test Albritton & Herbert LLP

[57] ABSTRACT

A method and apparatus for re-generating debug commands is provided comprising a source program having embedded debug commands in a first distinguishable field, and an assembler. The assembler operates on the source code extracting the embedded debug commands and associated address information from the source code while generating object code. The debug commands are stored in a command file for use during simulation. A simulator executes the assembled object code in conjunction with a debugger which executes the stored debug commands as designated during the execution cycle. Upon the termination of a simulation run and the subsequent modification of the source program, the debug commands are automatically re-generated with correct addresses as determined during the subsequent assembly. When the edited source file is loaded, the break-points are cleared and a new command file is executed to insure that the break-points are relocated to the correct source lines. The execution of the embedded debug commands can be enabled or disabled by means of a command line option, so when the debugging is complete, the debug information will not be outputted.

6 Claims, 9 Drawing Sheets

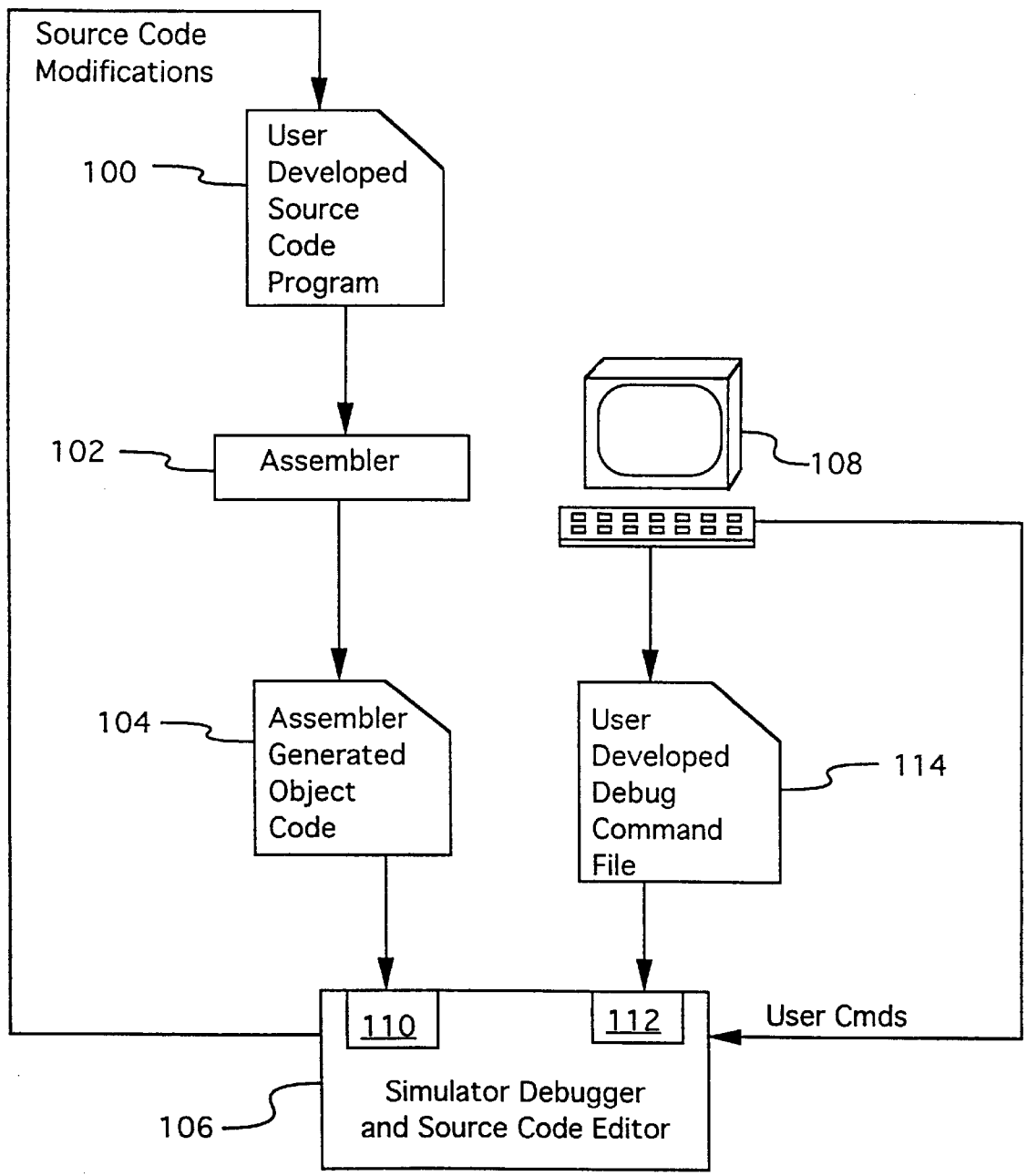
FIGURE 1a: Prior art

EMBEDDED DEBUG COMMANDS IN A SOURCE FILE

This is a continuation of application Ser. No. 08/366,050 filed Dec. 29, 1994 now abandoned.

The present invention relates generally to computer systems and particularly to an apparatus and method for automatically re-generating debug commands at proper addresses upon the modification of a source code program by a simulator.

BACKGROUND OF THE INVENTION

The present invention provides an improvement to the basic debugging technique used during code development. Debugging refers to detection and tracing of bugs, which are logical errors in computer programs. Debugging in the prior art typically made use of a combination of a simulator and a debugger. Simulators are used to execute the object code derived from a source program and interact with the debugger to control execution flow. Debuggers usually have a command language which can be executed in batch fashion from a debug command file. The command file typically contains break-point commands which set break-points at locations in the source file, indicated by an address, line number, a label or as an offset from a label. Typically a programmer will create these break-point commands manually during the simulation set up, providing for a breakpoint prior to the execution of a particular instruction (as indicated by the absolute address or label).

During simulation, the simulator will execute the object code until it arrives at a designated break-point. At break-points, debugger commands are utilized to examine registers, variables and other program parameters. If a parameter is inconsistent with expected results, then the user knows that there is a potential bug in the program. The debugger commands may then be used to print out a message, continue or halt the program.

Upon the discovery of a source program error, new code may be generated or the existing code may be modified or completely deleted. Subsequently, the source program will be re-assembled. Accordingly, the break-points which were established based on the original source code may need updating because of new line numbers or changed relative addresses of instructions in the newly assembled code. In prior art debuggers which utilized absolute addressing schemes, upon a re-run of a simulation, the end user is required to manually update the command file to reflect the new addresses at which break-points are to be set. Manual iterations would repeat in this fashion until the debugging/simulation had been completed.

In attempting to minimize the manual iterations performed, other prior art debuggers make use of labels instead of absolute addresses. In these debugger systems, a label is utilized in lieu of an absolute address during the initial manual specification of a particular break-point as part of the command file. During the assembly process a symbol table is created to store the absolute address associated with the particular label based on the current assembled version of the source program. Accordingly, during the re-assembly of a modified source program, the symbol table is updated with the new absolute address associated with each label. While manual edits of the debug command file are not required for each update to the source program, the "label" scheme is still unduly cumbersome and inefficient. First, during the initial specification of debug break-points, a user utilizing the "label" scheme described above is required to both insert the appropriate labels in the source program as well as manually create the command file. Second, any additional break-points that the user decides to set subsequent to the initial command file creation, will require both inserting appropriate labels in the source program as well as manually adding the desired breakpoint commands to the command file. In addition, the labels, as part of the source code program itself, are necessarily assembled forming part of the assembled object code. Accordingly, the labels take up space in the object file unless they are manually removed permanently at the end of the debug cycle. Due to the repetitive nature of the debugging process, any improvements which would eliminate manual manipulations of the debug command file or reduce assembly steps or minimize the assembled program size would be welcome in the art.

SUMMARY OF THE INVENTION

It is the object of the present invention to provide an apparatus and method for the automatic generation of a debug command file for use by a debugger during the simulated execution of an object code derived from a source program.

It is the further object of the present invention to provide a method and apparatus for automatically regenerating and accurately linking debug commands stored in an most recent command file to any corresponding new source code locations resulting from modifications made in the underlying source code.

It is another object of the present invention to provide a method and apparatus for linking debug commands to particular locations in a source program for ease of regeneration of the debug commands in subsequent assemblies.

It is another object of the present invention to provide an apparatus and method for identifying debug commands embedded in a line of a source code program.

It is still another object of the present invention to extract embedded commands from a source program during assembly so as to automatically create a command file for use with a debugger in the simulation of the object code derived from the source program.

It is still another object of the present invention to provide an assembled object code derived from a source program which is free of debug commands or their associated labels.

To achieve the foregoing and other objects and in accordance with the purpose of the present invention, a method and apparatus for regenerating debug commands is provided comprising a source program having embedded debug commands in a first distinguishable field, and an assembler. The assembler operates on the source code extracting the embedded debug commands and associated address information from the source code while simultaneously generating object code as required by the computer instruction. The debug commands are stored in a command file for use during simulation. A simulator executes the assembled object code in conjunction with a debugger which executes the stored debug commands as designated during the execution cycle. Upon the termination of a simulation mode and the subsequent modification of the source program, the debug commands are automatically regenerated at the correct address locations as determined during the subsequent assembly. Specifically, when an edited source file is loaded, the break-points are cleared and a new command file is created based on the embedded debug commands extracted during the assembly process. The new debug command file is then executed by the debugger, ensuring that the break-points are set to the correct source lines. The execution of the embedded debug commands can be enabled or disabled by means of a command line option, so when the debugging is complete, the debug information will not be outputted.

BRIEF DESCRIPTION OF THE DRAWINGS

Additional objects and features of the invention will be more readily apparent from the following detailed description and appended claims when taken in conjunction with the drawings, in which:

FIG. 1a illustrates the prior art process of generating a command file containing debug commands.

DETAILED DESCRIPTION OF THE DRAWINGS

Figure 1B:
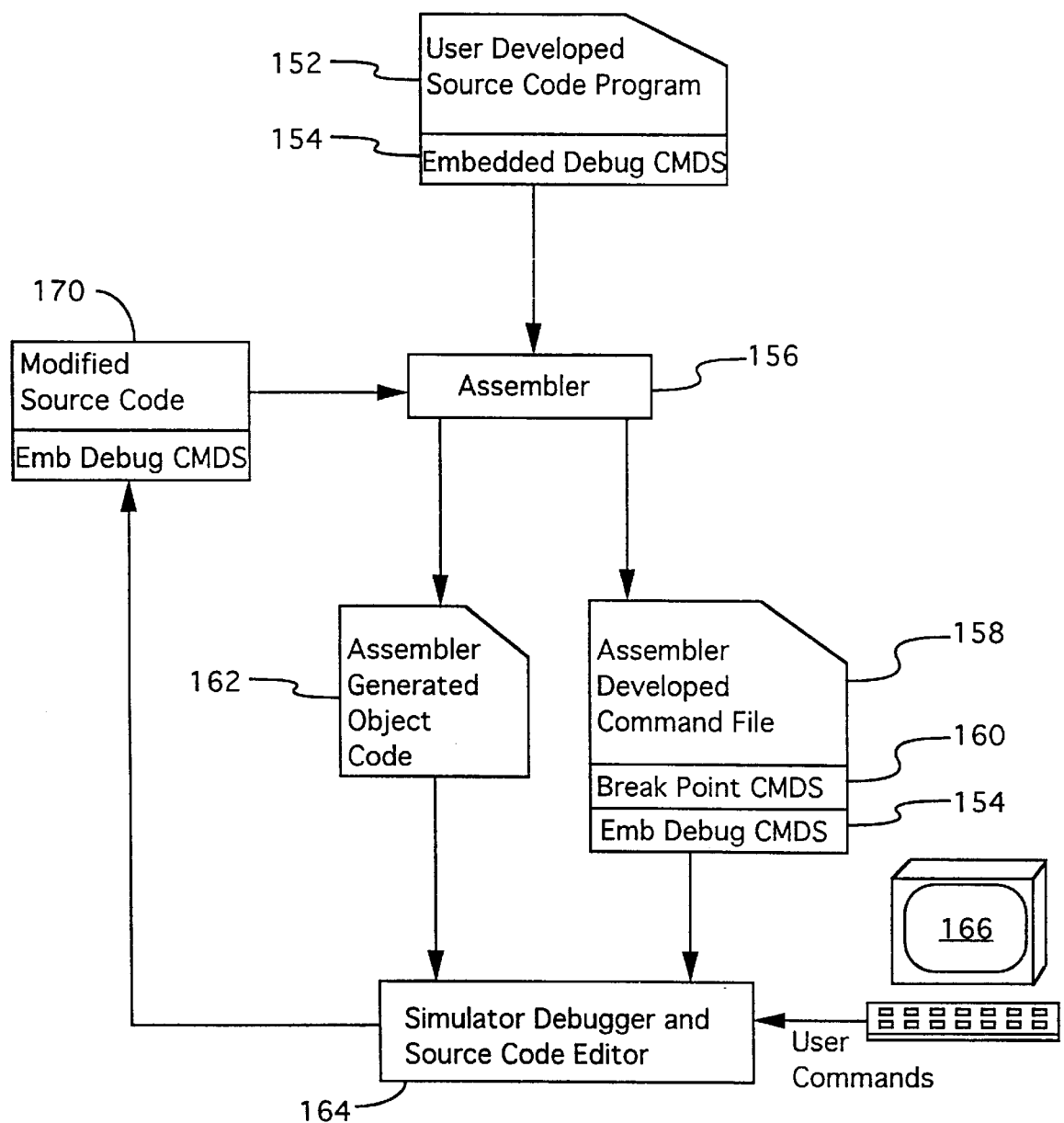
FIG. 1b illustrates the process of generating a command file containing debug commands according to the preferred embodiment of the present invention.

FIG. 1a illustrates a typical prior art process of generating a command file containing debug commands. First, the user (programmer) develops a source code program 100. The source code program 100 is then loaded into an assembler 102 for assembly. The resultant object code 104 is then ready for execution by a simulator/debugger and source code editor 106.

The simulator/debugger and source code editor 106 provide a convenient means for controlling the execution of the object code 104 and modifying the underlying source code 100 as required. The simulator/debugger and source code editor comprise a user interface 108, a simulation engine 110 and a debug engine 112. The user interface 108 allows a programmer to examine the underlying source code and create break-points in the program execution to perform interim checks. The debug engine 112 receives a debug command file 114 generated by the user interface 108 for execution by a debug command processor. Typically the commands that the debug command file contains would set break-points at various locations and specify at each break-point some debug information to be output. The break-points represent address locations at which the simulation engine 110 will halt execution of the object code 104 and instead allow execution by the debug command processor of a debug command stored in the debug command file 114 corresponding to that address location. In addition, after the object code has been loaded, the programmer may examine the code and manually insert program break-points via the user interface 108.

The simulator/debugger and source code editor 106 execute the object code in conjunction with the command file 114 during the simulation of the source program 100. At the completion of the simulation, modifications to the source program 100 may be necessary to cure "bugs" which have been detected. The process is repeated for each modification to the source code 100, each time including the generation (or manual regeneration) of the command file 114 by the user.

FIG. 1b illustrates the process of generating a command file containing debug commands according to a preferred embodiment of the present invention. First, the user (programmer) develops a source code program 152 which includes embedded debug commands 154. The source code program 152 and embedded debug commands 154 are then loaded into an assembler 156 for assembly. The assembler 156 of the present invention extracts the embedded debug commands 154 and generates a command file 158 including break-point commands 160 associated with the embedded debug commands 154. The assembler 156 simultaneously assembles the source code to create the assembled object code 162. The resultant object code 162 and command file 158 are then ready for execution by a simulator/debugger and source code editor 164. After program execution or halt, the command file is wiped clean of all break-points associated with the old embedded debug commands 154. Subsequent modifications of the source code 152 by means of the user interface 166 result in a new source code 170 which includes the original embedded debug commands 154. The new source code 170 can then be loaded into the assembler 156 for automatic generation of a new set of accurate break-point locations for each embedded debug command 154.

Figure 2:
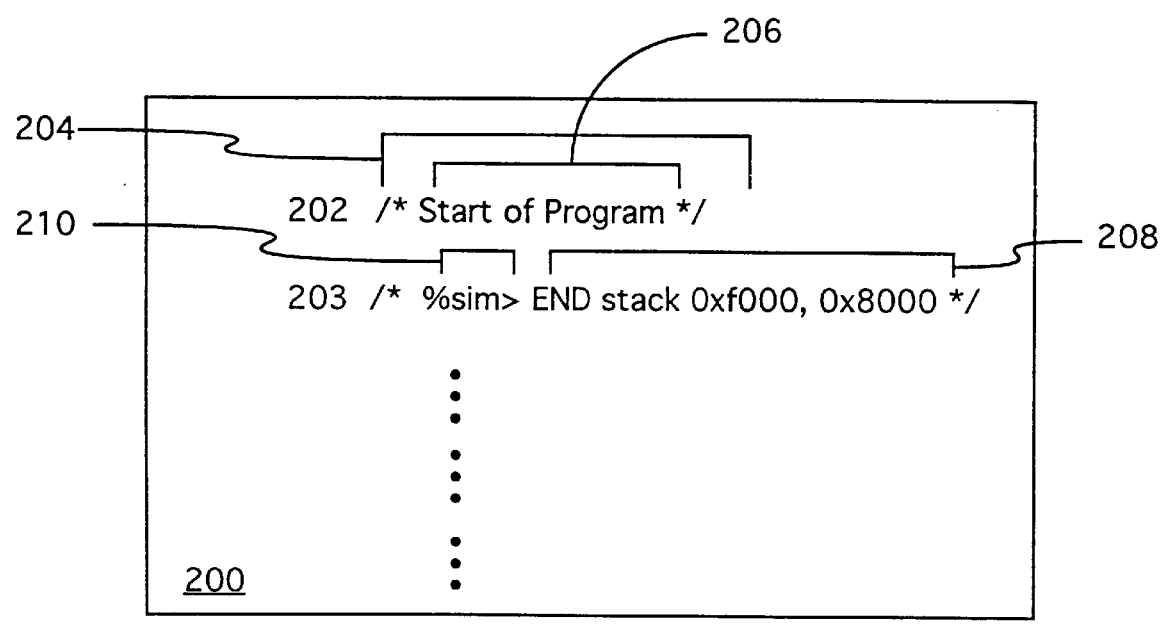
FIG. 2 is a portion of a source code program implementing embedded debug commands according to the preferred embodiment of the present invention.

FIG. 2 illustrates a portion of a source code program 200 utilized in the preferred embodiment of the present invention. The source code program 200 includes individual program lines 202 and 203 having a comment field 204 for storing comments 206 or alternatively embedded debug commands 208. The user can add the debug commands when editing the source code program 200. Typically, debug commands evaluate program parameters and then decide whether execution of the object code should continue or be halted. Often, the debug commands will print out values or messages to indicate status to the operator who is performing the simulation. In the preferred embodiment, the debug commands are written as comments in a comment field 204 of the source code program 200 with a special prefix 210 at the beginning of the comment to indicate that they are not ordinary comments.

Those ordinarily skilled in the art will recognize that the debug commands of the preferred embodiment may be embedded in other manners in a target line of a source program. Depending on the particular language requirements of the source program, other locations in a target line of the source code may be better suited for the embedding. Those ordinarily skilled in the art will recognize that the placement of the embedded commands in areas other than the comment field, will necessitate a corresponding change in the assembler that extracts the debug commands for insertion into the command file. While reference has been made to a comment field and a particular identifier for use in the preferred embodiment, the selection of other fields or identifier means may be made without departing from the spirit of the present invention. Accordingly, the embedding of the debug commands is not dependent on a particular line format for a given source code program, rather only on the generation and identification in, and removal from, a given source code program.

According to a first embodiment of the present invention, the debug commands embedded into the comment field 204 may be written in the same programming language for processing by a single processor which executes both the object code simulation and also executes the debug commands as is required during a given simulation. Alternatively, the embedded debug commands may be written in a different language or in a higher level language for processing by a second separate debug processor in a simulation system. The present invention will be described with a view toward general debug commands for either a single or multiple language or processor environment.

All of the debug commands generally can be described as either "END" commands or break-point commands. "END" commands are to be performed when the execution of the object code has completed without any intermediate halts by the user or the system. Break-point commands interrupt the execution of the object code program at designated addresses stored in a command file and perform status checks on program parameters. Break-point commands can be categorized as being of two major types: 1) "HALT" commands, which result in the termination of the simulation (and necessarily the execution of the object code) due to overflow conditions or other serious errors; and finally 2) "CONT" commands, which perform a debug function as directed by the individual command, then continue execution of the object code by the simulator where the break occurred. HALT debug commands are also used to allow user inspection of program parameters with program halted. The invention will be described in greater detail with reference as to how these individual classifications of debug commands are handled by the apparatus and methods of the present invention.

Figure 3:
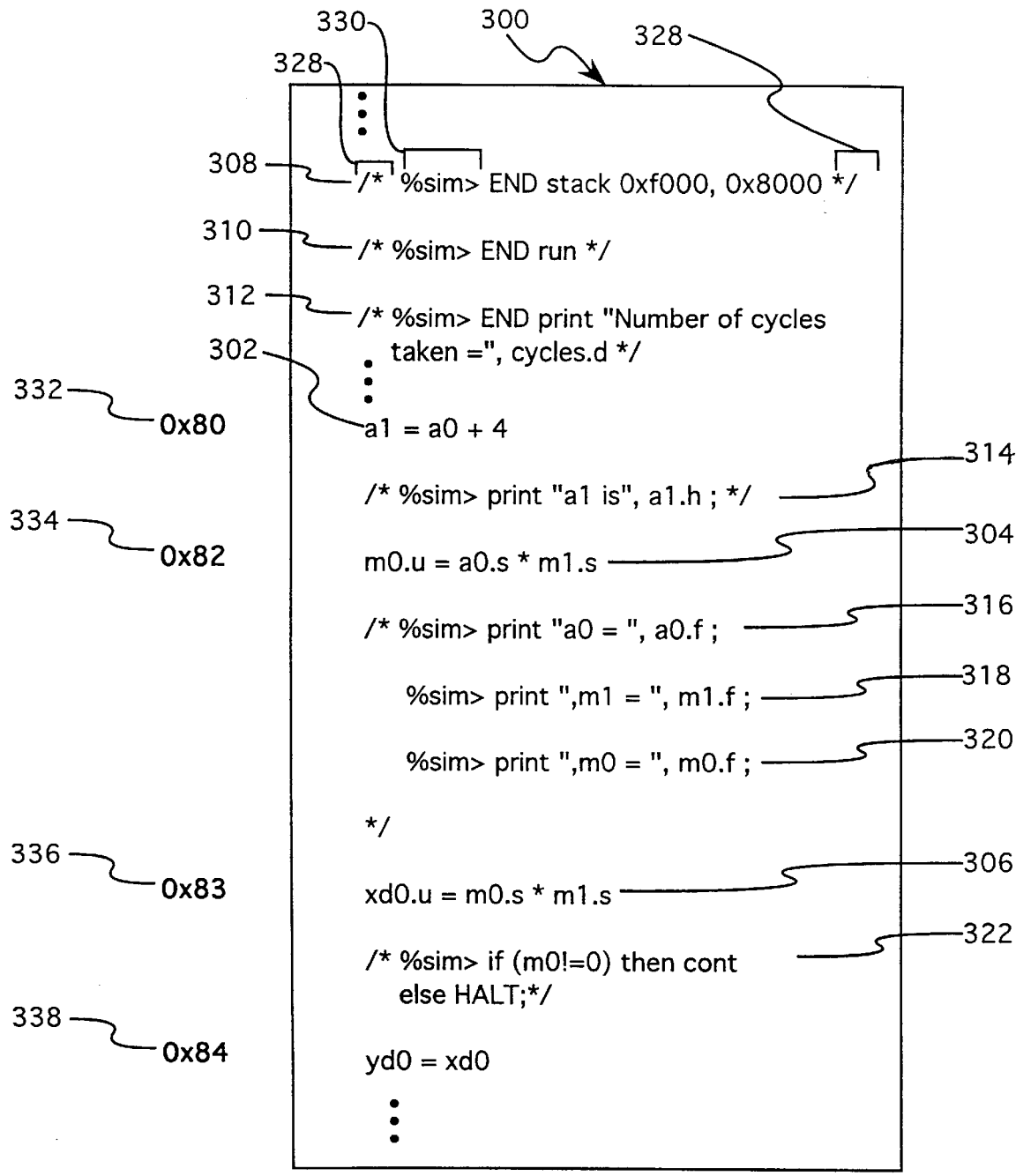
FIG. 3 is a sample source code program including embedded debug commands.

FIG. 3 illustrates an example of a source code program 300 with embedded debug commands. This program 300 contains assembly language codes 302, 304, 306 and embedded debug commands 308, 310, 312, 314, 316, 318, 320, and 322. In program 300, the "/*" and "*/" strings 328 indicate that a given program line is a comment and not an ordinary assembly language code. In the preferred embodiment of the present invention, a second identifier "%sim>" 330 is used to indicate a debug command is present. The "%sim>" string located just after the "/*" string indicates that this comment contains an embedded debug command and is not an ordinary comment. Relative memory locations 332, 334, 336 and 338 are shown in the margin next to the source program 300. These locations relate to an area in memory into which the instructions theoretically have been loaded after assembly. They are not part of the source program, and are only used to identify individual instructions for clarity purposes in conjunction with the debug command file illustrated in greater detail below.

Figure 4:
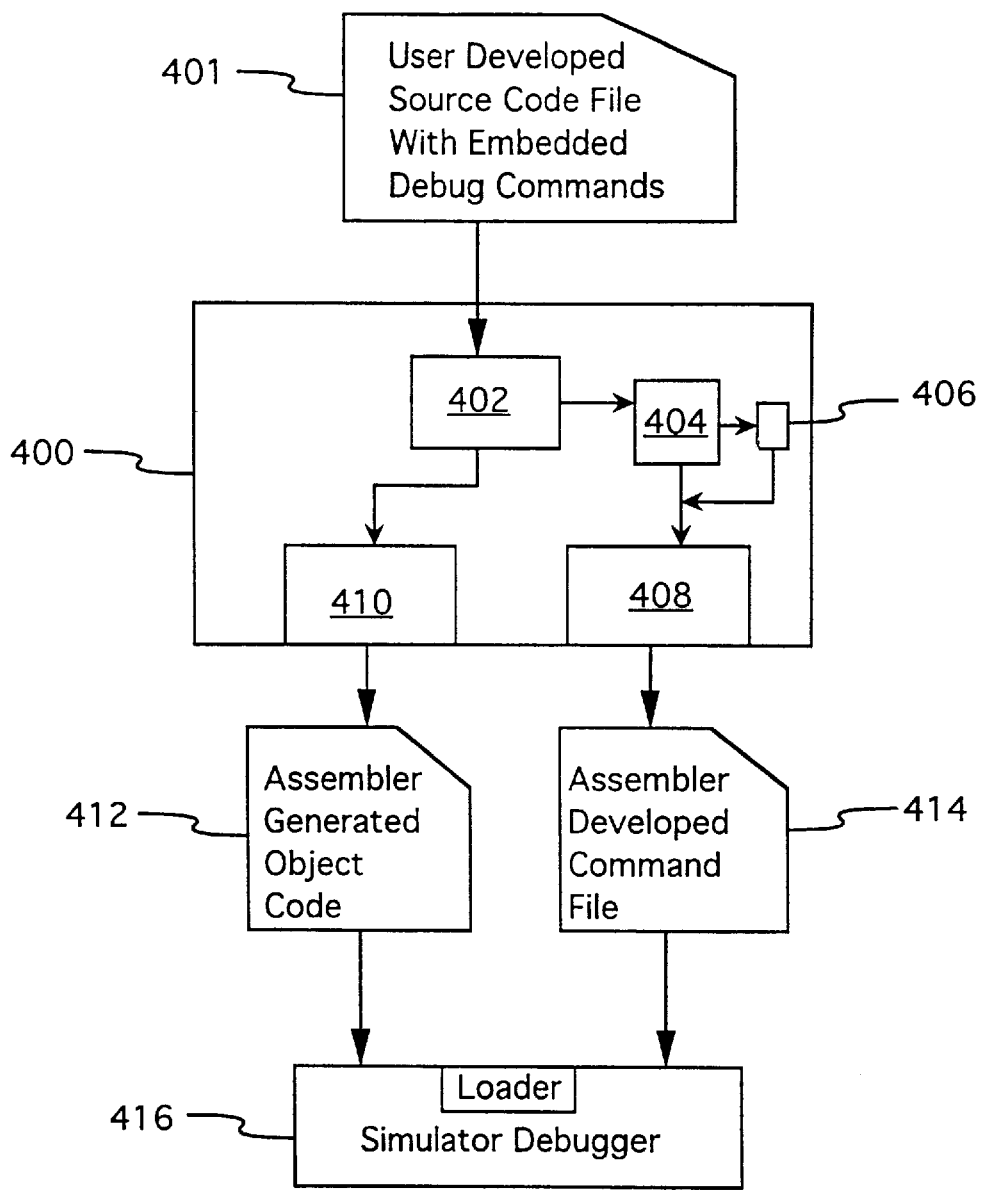
FIG. 4 is a block diagram of an assembler according to the preferred embodiment of the present invention.

Referring now to FIG. 4, the assembler 400 of the preferred embodiment of the present invention is shown. A user developed source code 401 including embedded debug commands is loaded into the assembler 400 for processing. The assembler 400 performs the extraction of the embedded debug commands and the assembly of the source code into object code. The assembler 400 comprises a decoder 402, a command processor 404, a memory module 406, a command file generator 408 and object code generator 410. The decoder 402 extracts the embedded debug commands from the source program and passes the embedded commands to the command processor 404. The command processor 404 determines the type of debug command and either stores the command temporarily in the memory module 406 or generates an appropriate break point command for inclusion in the command file. The command file generator 408 receives break point commands and associated embedded debug commands from the command processor 404 and also debug commands previously stored in the memory module 406 and generates a command file 414 for transfer out to the simulator/debugger and source file editor 416. Simultaneously, the object code generator 410 operates on the source code and generates an object code 412 for execution by the simulator/debugger and source code editor 416. The assembler 400 outputs (assembled object code 412 and command file 414) are then transferred to the simulator/debugger and source code editor 416 for execution of a simulation during code development.

Figure 5:
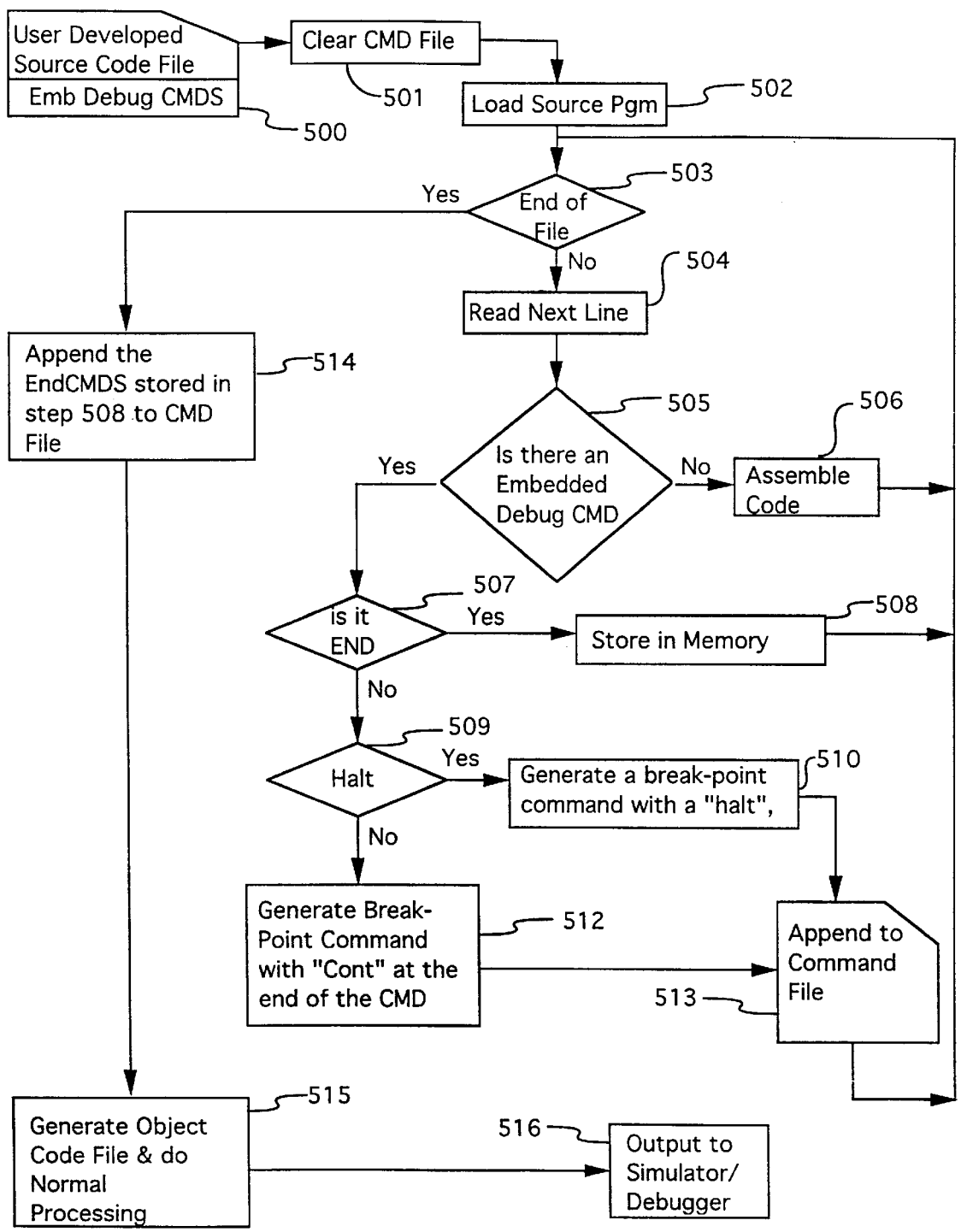
FIG. 5 is a flow diagram of the process for generating a command file according to the preferred embodiment of the present invention.

FIG. 5 is a flow chart of the process for generating a command file performed by the assembler of the present invention. A source program including debug commands is developed (500) by the user. The command file is cleared (501) after which the source program is loaded (502) into the assembler 400. The decoder 402 initiates the extraction processes checking (503) to see if the source file end has been reached, and if not reads (504) in a first (or next) line of code for processing. The decoder 402 determines (505) if there is an embedded debug command present in the source code line, and if not assembles (506) the line of code and returns to read in the next line of code at step 504. If an embedded debug command is present the decoder 402 extracts the debug commands from the source code for processing by the command processor 404 a single command at a time.

The command processor 404 first checks (507) to see if the extracted debug command is an "END" command. "END" commands are to be placed at the end of the command file generated by the command file generator 408. Accordingly, all commands recognized as "END" commands are temporarily stored (508) in memory 406 to be appended at the end of the command file. As was described above, "END" commands are debug functions to be performed when the object code has fully executed without being interrupted by an intermediate user or system halt. If an "END" command is recognized, then the assembler returns to read in the next line of code at step 504.

All other debug commands are to be processed at their respective address locations resulting in a break from normal program execution. The two other basic forms of debug commands "HALT" and "CONT" commands will be discussed separately. The command processor 404 checks (509) to see if the extracted debug command ends in a "HALT." If there is a "HALT" at the end of the debug command, the command processor 404 will generate (510) a break-point command with a "halt" at the end of it. This command is written (513) to the command file and includes the relative address in memory associated with the position of the debug command in the source program. Those ordinarily skilled in the art will recognize that until the object code has been loaded into a designated address space in memory by the simulator loader, no actual address locations exist, and all addressing is only relative to a theoretical base address at which the source code originates. The "HALT" command acts to stop the execution of the object program and often is used to indicate overflow or other serious error conditions.

Finally, if the debug command being processed does not contain a "HALT" at the end of the command, then it is of the "CONT" (continue) type and the command processor 404 will generate (512) a break-point command and automatically append a "CONT" command at the end of the debug command. The actual debug command, relative address location and continue command are then written (513) to the command file for execution during simulation. The "CONT" command acts to restart the execution of the object program at the point where the break occurred.

The assembler 400 will read in the next line of code at step 504 until the source program has been completely processed. After all lines of the source code have been assembled, the assembler 400 will append (514) the "END" commands stored in memory 406 (at step 508) to the end of the command file. Finally, the assembler will generate (515) the object code file and perform any other normal processing functions prior to outputting (516) the object code and command file to the simulator/debugger for execution.

Returning to the sample program of FIG. 3, the process for creating the command file will be discussed in conjunction with the sample source code program 300. The assembler is first loaded with the source code 300 including embedded debug commands. A first embedded debug command 308 would be identified (505) for processing. The decoder 402 would recognize the comment field identifier "/*" 328 followed by the second identifier "%sim>" 330 as indicating a debug command was included at this location. Since the embedded debug command is an "END" command, it is stored (508) off in memory 406 to be appended (514) to the end of the debug command file. Similarly, the decoder 402 would recognize embedded debug commands 310 and 312, and the command processor 404 would again store (repeat step 508) these "END" commands in memory.

The decoder 402 would identify the next embedded debug command 314 and, since it was not an "END" or "HALT" command, the command processor 404 would generate (512) a break-point command to print the text "a1 is" along with the value of the variable (or register) a1.h. The break-point command would be appended (513) to the command file along with the relative address location 334 of the next instruction in the source file. Accordingly, the break-point command is executed prior to the execution of the next program instruction. In addition a "CONT" (continue) command would be appended onto the individual debug command (in this case the print command) indicating that program execution should resume at memory location 334 (address 0x82) the position where the break occurred. Similarly, the three embedded debug commands 316, 318 and 320 would be appended (513) to the command file with their respective continue commands (512) and the relative memory location 336 associated with the next instruction to be executed. The assembler of the present invention processes each embedded debug command separately, even here where they are actually all part of the same extended comment field.

Continuing the extraction, the decoder 402 would identify the next embedded debug command 322. This debug command is a "HALT" command, and would result in an execution halt as opposed to a continue as described above if the condition is not satisfied. In response to the embedded debug command 322, the command processor 404 would generate (510) a break-point command to check the value of the m0 string at this location. The break-point command would be appended (513) along with the relative address location 338 to the command file. The remaining source code program lines are processed in a similar fashion until the end of the source file is reached. The assembler then appends (514) the end commands stored in memory 406 at the end of the command file and then generates (515) the object code file for output (516) along with the command file to the simulator/decoder and source code editor 416.

Figure 6:
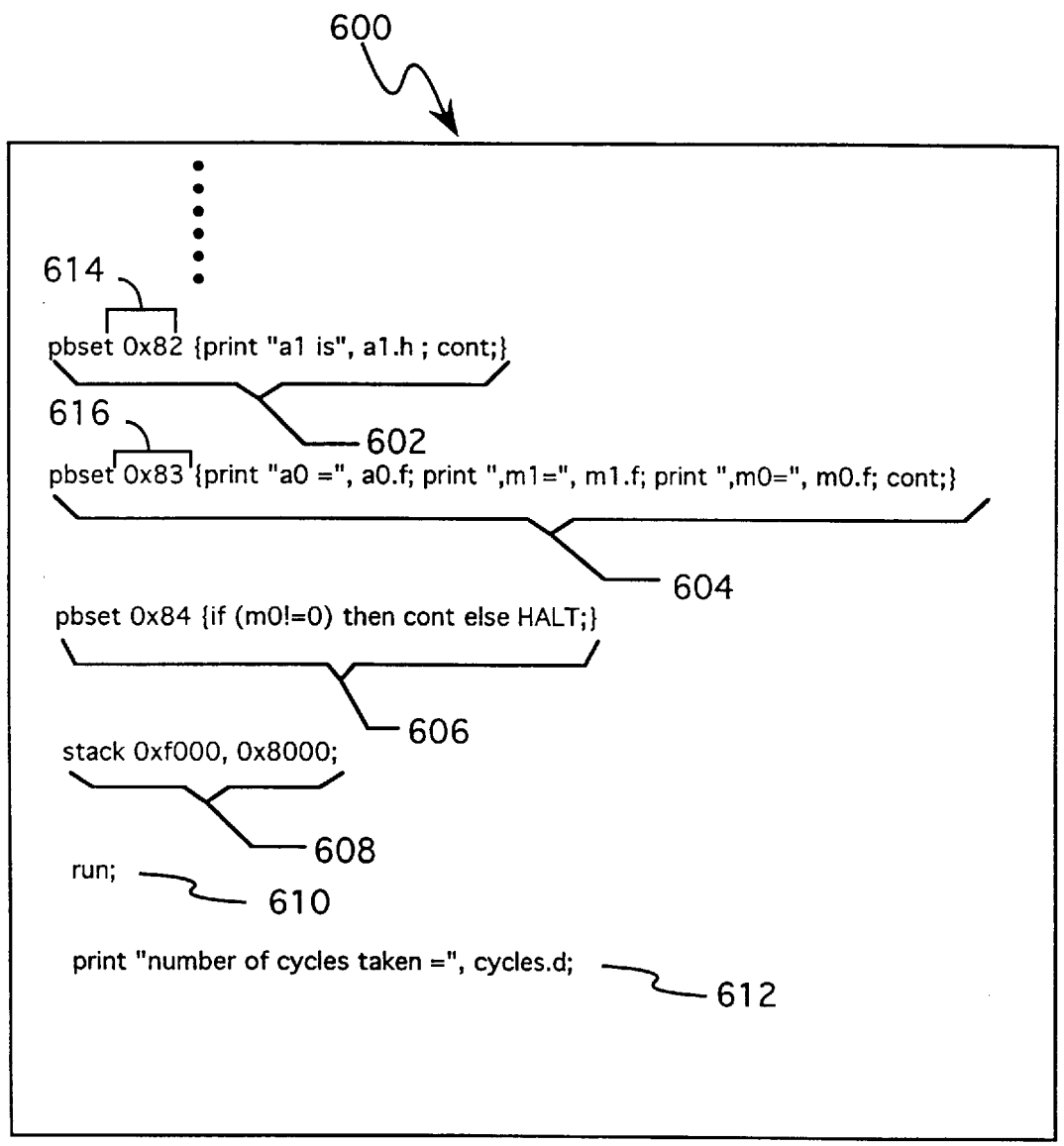
FIG. 6 illustrates the command file generated by the assembler from the source code in the example of FIG. 3.

FIG. 6 illustrates the command file 600 generated by the command file generator 408 from the source code 300 in the example of FIG. 3. The command file 600 contains the break-point commands 602, 604 and 606 and "END" commands 608, 610 and 612. Command 602 is a break-point command generated from the debug command 314 in FIG. 3. When the decoder 402 read the command 314, it extracted the strings "/*" and "%sim>" and "*/", and thereby determined that command 314 was a debug command. The command processor 404 then checked to see if this was an "END" command. Since it was not an "END" command, the command processor 404 checked the end of the command line 314 to see if there was a "halt", and since there was not, the command processor 404 generated the break-point command 602. The 0x82 (hexadecimal) address 614 indicates that the break-point is to be executed prior to the execution of the instruction found at the 0x82 address as illustrated in FIG. 3. Since the debug command 314 was not an "END" command and did not have a "halt" at the end of it, the command processor 404 automatically appended a "cont" at the end of the break-point instruction 602. "Cont" causes the debugger to resume (continue) execution of the object code. Similarly, the break-point commands 604 and 606 are generated from the debug commands 316, 318, 320 and 322 respectively.

The command 608 is generated from the "END" command 308. When the command processor 404 read this command, it identified it as an "END" command, thus saved it in the memory, and when the assembly was completed, it appended it at the end of the command file 600. Similarly, commands 610 and 612 are generated from the debug commands 310 and 312 respectively. Note that the commands 608, 610 and 612 are the last three commands in the command file 600. All the non-"END" commands 602–606 are written above the "END" commands.

In the prior art techniques, the user has to manually create the command file 600. Thus, the addresses 614 and 616 would be determined by the users after examining the loaded file. When the source programs are modified and source code lines are added or deleted or moved around, modification of the addresses 614 and 616 will necessarily result. In those situations, the user has to re-calculate the addresses of the break-points 614 and 616 and edit the command file 600 each time the source program 300 is changed. The present invention has solved this problem by automatically generating the command file 600 from the users embedded debug commands contained in the source program 300.

Figure 7:
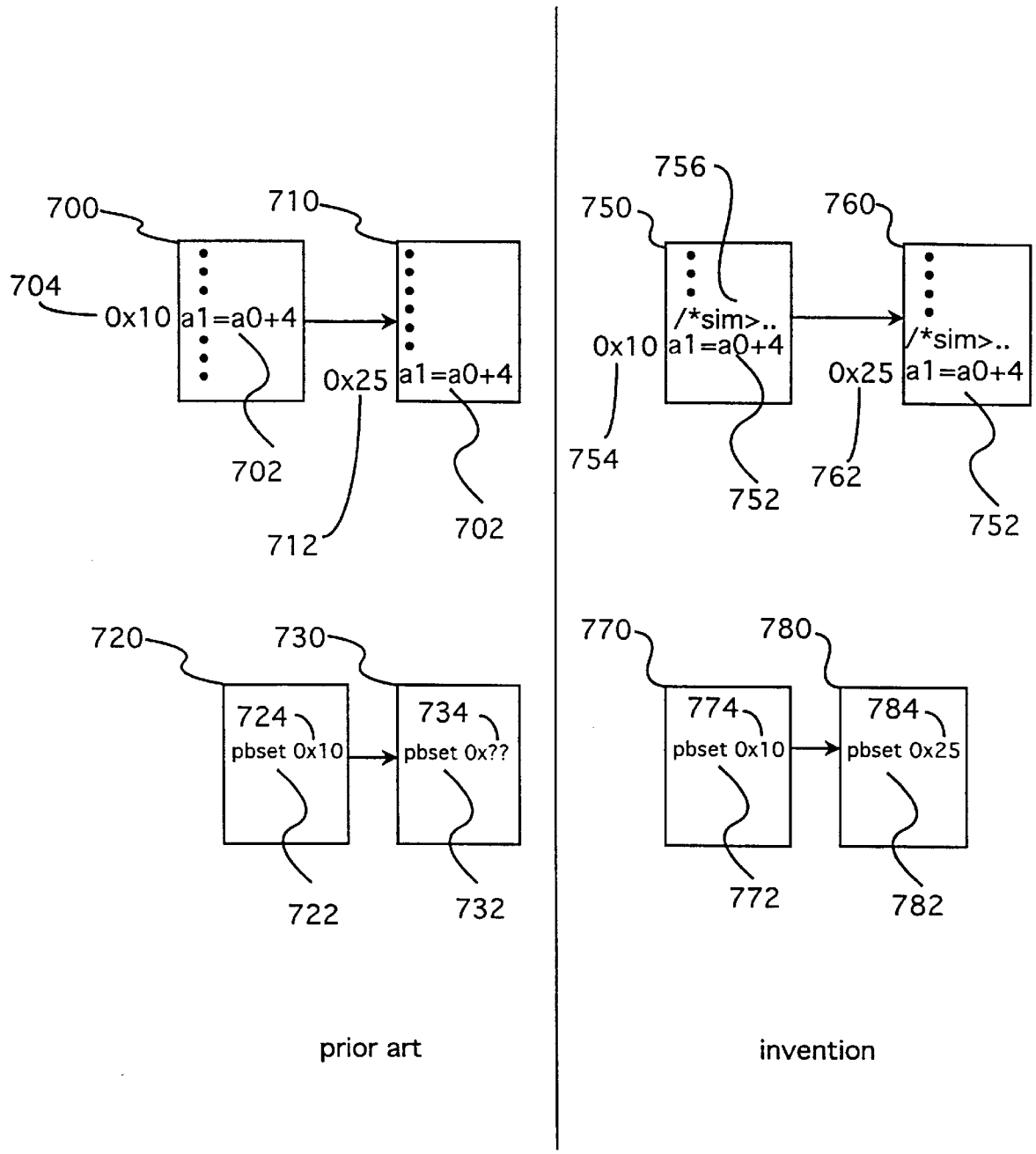
FIG. 7 illustrates the effect of source code modifications in both the prior art and the present invention.

FIG. 7 illustrates the effect of a modification of source code in both the prior art and the present invention. The left hand side shows a portion of a source code program before and after it is edited in the prior art, and the resultant effect on the command file (necessitating a user manual address update). The right hand side shows the effect of the same source code modification when implemented with the present invention.

In source program 700, one line of assembly language code 702 is shown to demonstrate an example. Source code program 700 represents a user developed program in the prior art. This program 700 only contains assembly language codes and no embedded debug commands. A relative line number 704 representative of a memory location is shown. For the purposes of this description, a relative address of 0x10 (hexadecimal) is associated with this particular line number 704, indicating this particular line of code will be assembled at the relative address 0x10 (hexadecimal). The line numbers are not part of the source programs 700 or 750, and are shown to illustrate this example only. Typically when the source code is edited, lines of new code are added, and/or old code is deleted, and occasionally instructions are moved around in the program. For the purposes of this example, source code lines will be added to show the effect on the command file of the prior art and that of the present invention.

Source code program 710 represents the modified version of the source code program 700. The same line of code 702 that was in the source code program at relative address 0x10 (704), is now located at relative address 0x25 (712), due to the addition of new lines of source code above this line. Command File 720 represents the user developed command file with break-point command 722, generated for the source program 700. In order to generate this break-point command 722, the user has to manually calculate the address of the break-point location 724. When the user edited the source code program 700 and created a new program 710, the user must now manually edit the command file 720 and create a new file 730 to change the break-point command 732 for the new break-point location 734. This is because the manual break point generation scheme of the prior art cannot accommodate for changes in the source program. Each time source program changes occur, a user who desires to keep an old break-point command must verify and update the address locations associated with the old break-point to reflect the relative changes in the source program.

Program 750 represents a user developed source code program with embedded debug commands as provided for in the present invention. Again, a single line of assembly language code 752 is shown to demonstrate this example. An embedded debug command 756 is shown at location 756 associated with the relative address 0x10 (hexadecimal) followed by an assembly language instruction 752. The embedded debug command 756 is provided in the source code 750 for processing by the assembler of the present invention. The user embedded debug command 756 is designated by the string "/* %sim>". Program 760 represents the edited version of the source code 750. The same lines of code 752 and 756 are now located at relative memory location 762 (at relative address 0x25) due to the addition of new code.

File 770 represents the assembler generated command file from the source program 750 with the break-point command 772 and relative memory address 774. The break point command 772 is generated by the assembler of the present invention after extraction of the associated embedded debug command 756 in the source program 750. File 780 is the assembler generated command file from the edited source program 760, with the break-point command 782 and relative address 784. As described previously, since the assembler is generating the command file 780, all the break-point location calculations are done by the assembler itself during the extraction process. When the user modifies the source program 750 to source program 760, and reloads it, the break-points 772 set by the embedded commands are regenerated with the correct new address locations as break-point 782. This ensures that the old break-points 772 are automatically relocated to the correct source lines 784.

Figure 8:
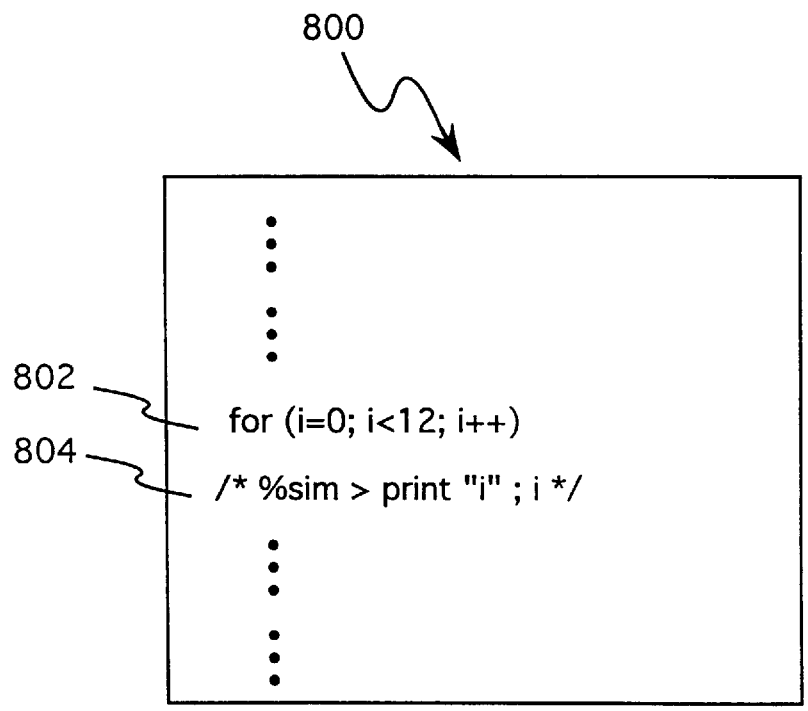
FIG. 8 illustrates an alternative embodiment of the present invention incorporating multiple language commands.

Although the present invention has been implemented in assembly language source code, the same can also be applied to other languages including high level languages such as C and C++. FIG. 8 illustrates an alternative embodiment of the present invention. Previously, the embedded debug command method was described in conjunction with an assembly language source code. The same concepts apply when the source code program is written in a high level language. Only the high-level language compiler need be expanded to recognize the debug commands so as to automatically generate a command file according to the principles disclosed herein.

Program 800 represents a source code program written in a high level language. Line 802 in this program represents an ordinary source statement and line 804 in this program represents a debug command. Just as described previously in conjunction with the preferred embodiment wherein the assembler of the present invention recognizes a debug command, a modified high level language compiler can be implemented to recognize debug commands so as to allow for the automatic re-generation of a debugger command file.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system, a method for automatically generating a debugger command file having debug commands for execution during source code simulation comprising the steps of:
   (1) embedding at least one debug command in at least one line of a source program;
   (2) assembling said source program, said assembling step including:
      (a) extracting said embedded debug commands,
      (b) generating a break-point command associated with each of said embedded debug commands,
      (c) creating said command file by writing said break-point commands and associated debug commands into said command file, and
      (d) generating an object code from said source program; and
   (3) upon modification of said source program, removing said break point commands and associated embedded debug commands from said command file so that during re-assembly of said modified source program, a new command file is automatically created containing new break point commands associated with said embedded debug commands at their new respective locations in said source program.

2. An apparatus for automatic regeneration of break-points in a debugger command file for execution in conjunction with a simulation of a source program comprising:
   a source program with at least one embedded debug command;
   an assembler, said assembler including
      a decoder for extracting said embedded debug commands from said source program,
      an object file generator for assembling said source program into object code,
      a debug command file generator for creating a debug command file including said embedded debug commands extracted by said decoder and break-point commands associated with said extracted embedded debug commands; and
   a debugger for executing said break point commands and said embedded debug commands in said debug command file during said simulation of said source program;
   such that said break-point commands and embedded debug commands are automatically re-generated after a modification is made to said source program by the subsequent re-assembly of said source program prior to simulation execution.

3. The apparatus of claim 2 wherein said source program is written in a high level language.

4. The apparatus of claim 2 wherein said embedded debug commands are written in a different language than said source code program.

5. The apparatus of claim 2 including a command line option for selectively enabling and disabling execution of said embedded debug commands.

6. The apparatus of claim 2 wherein said source program comprises lines having a comment field, said comment field including said embedded debug command and a special prefix indicating the presence of said embedded debug command.

* * * * *